(12) United States Patent
Guderzo et al.

(10) Patent No.: US 7,223,189 B2
(45) Date of Patent: *May 29, 2007

(54) ELECTRONICALLY SERVO-ASSISTED BICYCLE GEARSHIFT AND RELATED METHOD

(75) Inventors: Gianfranco Guderzo, Vicenza (IT); Giuseppe Dal Pra', Vicenza (IT)

(73) Assignee: Campagnolo SRL, Vicenza (IT)

(*) Notice: Subject to any disclaimer, the term of this patent is extended or adjusted under 35 U.S.C. 154(b) by 538 days.

This patent is subject to a terminal disclaimer.

(21) Appl. No.: 10/664,305

(22) Filed: Sep. 16, 2003

(65) Prior Publication Data

US 2004/0110585 A1   Jun. 10, 2004

(30) Foreign Application Priority Data

Dec. 6, 2002   (EP) .................................. 02425751

(51) Int. Cl.
F16H 61/02 (2006.01)
F16H 9/00 (2006.01)
B62M 1/99 (2006.01)

(52) U.S. Cl. ........................ 474/70; 280/260; 280/259; 701/57

(58) Field of Classification Search ............ 474/64–71, 474/78–82; 280/253–261, 237–239; 701/51–59
See application file for complete search history.

(56) References Cited

U.S. PATENT DOCUMENTS

| 4,490,127 | A | * | 12/1984 | Matsumoto et al. | .......... 701/64 |
| 5,213,548 | A | | 5/1993 | Colbert et al. | |
| 5,261,858 | A | * | 11/1993 | Browning | ..................... 474/69 |
| 5,356,348 | A | * | 10/1994 | Bellio et al. | .................. 474/70 |
| 5,357,177 | A | | 10/1994 | Fey et al. | |
| 5,470,277 | A | | 11/1995 | Romano | |
| 5,480,356 | A | | 1/1996 | Campagnolo | |
| 5,577,969 | A | * | 11/1996 | Watarai | ........................ 474/78 |
| 5,599,244 | A | * | 2/1997 | Ethington | ..................... 474/70 |
| 5,865,454 | A | | 2/1999 | Campagnolo | |
| 6,047,230 | A | * | 4/2000 | Spencer et al. | ............... 701/57 |
| 6,146,297 | A | * | 11/2000 | Kimura | ........................ 474/78 |

FOREIGN PATENT DOCUMENTS

| DE | 3938454 | 5/1991 |
| EP | 1103456 | 10/2000 |

* cited by examiner

Primary Examiner—Marcus Charles
(74) Attorney, Agent, or Firm—Volpe And Koenig, P.C.

(57) ABSTRACT

A method for electronically servo-assisting a bicycle gearshift, including the steps of: a) driving an actuator of a bicycle gearshift to displace a chain of the gearshift in an axial direction with respect to a gearshift group comprising at least two sprockets; b) receiving information on the desired alignment between the chain and a predetermined sprocket of the gearshift group; and c) setting a biunique correspondence between the physical position of the actuator at step b) and a logic value associated with the gear ratio relative to the predetermined sprocket.

53 Claims, 6 Drawing Sheets

ELECTRONICALLY SERVO-ASSISTED BICYCLE GEARSHIFT AND RELATED METHOD

FIELD OF THE INVENTION

The present invention concerns an electronically servo-assisted bicycle gearshift and a method for servo-assisting a bicycle gearshift, as well as a program and an electronic circuit for carrying out the method.

BACKGROUND

Electronically servo-assisted bicycle gearshifts are described in U.S. Pat. Nos. 5,480,356; 5,470,277; and 5,865,454; 6,047,230; European patent application EP 1 103 456; and in German patent application DE 39 38 454 A1.

EP 1 103 456 describes a type of gearshift wherein the position transducers are of the absolute type, capable of providing an electrical signal indicating the absolute position of the derailleurs, this type of transducer takes into account the actual position of the derailleurs, therefore operation of the device is not detrimentally affected by displacements of the gearshift mechanism which occur when the device is switched off.

For correct operation of the gearshift in normal ride operating mode (i.e. wherein the gearshift is commanded manually by the rider or automatically or semi-automatically by the electronic control unit), the rear and front actuators must preliminarily be aligned in a start position, used as a reference (together with information on the position of the various sprockets and/or on the distance or pitch between adjacent sprockets) to displace the chain between adjacent sprockets to carry out the gear-shiftings. The start or reference position is usually the one in which the chain is at the sprocket with the smallest diameter.

In the prior art mechanically commanded gearshifts, the alignment in the start position is carried out with manual adjustment devices which provide for correcting the position of a steel cable which is used to actuate the displacements during a gear-shifting.

In electronically servo-assisted gearshifts, the electronic control unit, to carry out the displacement of the chain between two adjacent sprockets, drives the actuator referring to logic positions (logic values) representative of the physical positions of the various sprockets.

In these types of gearshifts, the setting of the start or reference position is usually carried out in the factory, causing the derailleur, in absence of a control signal of the actuator, to be at the sprocket with the smallest diameter. The invention described herein seeks to overcome various shortcomings in the prior art.

SUMMARY

The object of the present invention is to make it possible to overcome misalignments in a sufficiently rapid manner as to be able to do so during a cycle race, in particular whilst in motion, without the need to mount the bicycle on a stand.

In a first aspect thereof, the present invention concerns a method for electronically servo-assisting an electronically servo-assisted bicycle gearshift, including the steps of:

a) driving an actuator of a bicycle gearshift to displace a chain of the gearshift in an axial direction with respect to a gearshift group comprising at least two sprockets, in a first direction or in a second direction opposite to the first direction, b) receiving information on the desired alignment between the chain and a predetermined sprocket of the gearshift group, and c) setting a biunique correspondence between the physical position of the actuator at step b) and a logic value associated with the gear ratio relative to the predetermined sprocket.

BRIEF DESCRIPTION OF THE DRAWINGS

Further characteristics and advantages of the present invention shall become evident from the following detailed description of presently preferred embodiments thereof, which is with reference to the attached drawings. In the drawings.

DETAILED DESCRIPTION OF THE PREFERRED EMBODIMENTS

Figure 1:
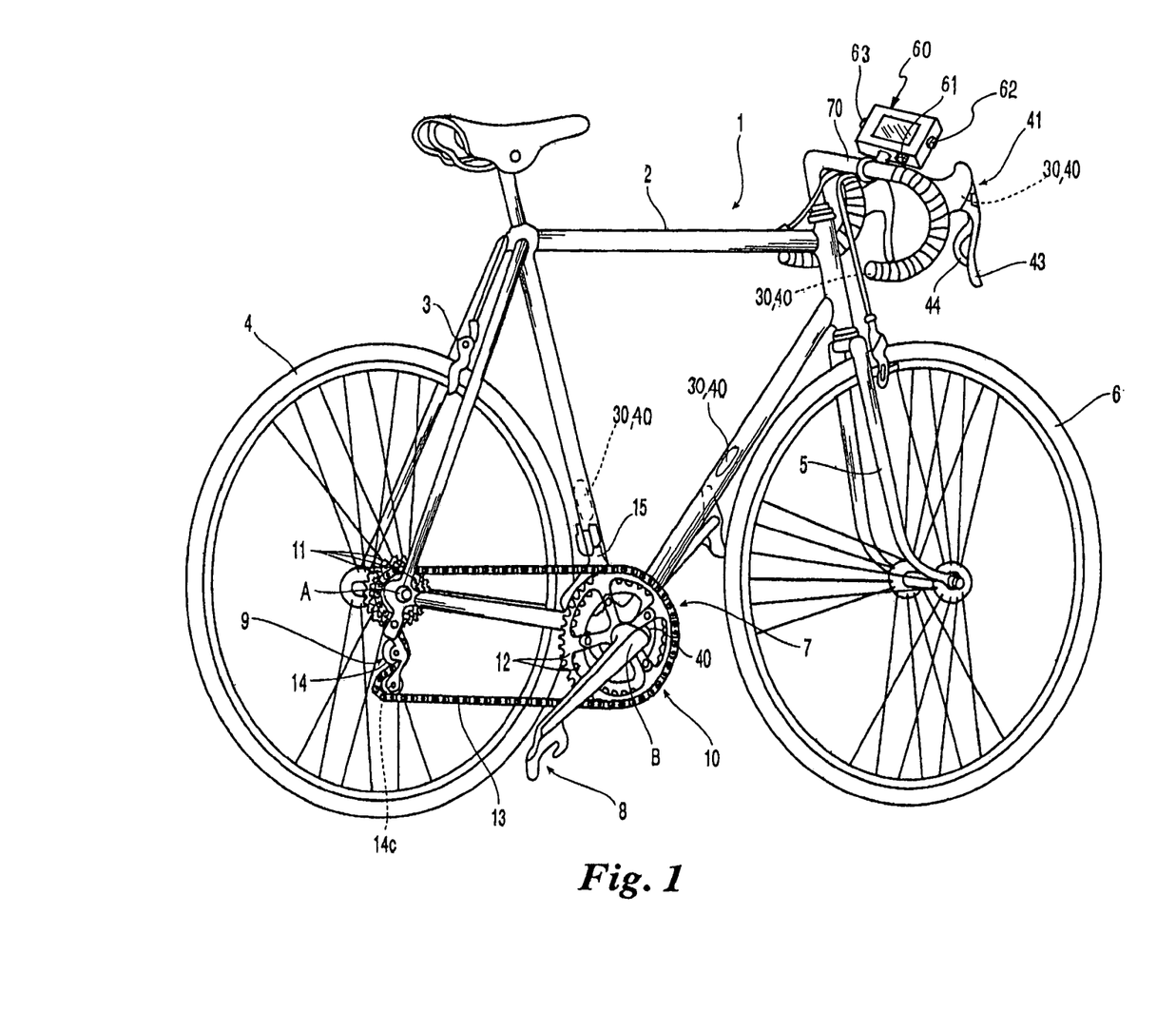
FIG. 1 schematically illustrates a perspective view of a bicycle equipped with an electronically servo-assisted gearshift according to the present invention.

With reference to FIG. 1, a bicycle 1, in particular a racing bicycle, includes a frame 2 formed in a known way to define a support structure 3 for a rear wheel 4 and a fork 5 for a front wheel 6. A handlebar 70 is operatively connected to the fork 5.

The frame 2, at its lower portion, supports an axle of the pedals or pedal unit 7, of a conventional type, to actuate the rear wheel 4 through an electronically servo-assisted gearshift system according to the invention, generally indicated with reference numeral 8.

The gearshift system 8 includes a rear gearshift group 9 and a front gearshift group 10. The rear gearshift group 9 includes a plurality of sprockets 11 having different diameters and being coaxial (axis A) with the rear wheel 4. The front gearshift group 10 includes a plurality of sprockets or crowns or gears 12 having different diameters and being coaxial (axis B) with the axle of the pedal cranks 7.

The sprockets 11 of the rear gearshift group 9 and the sprockets 12 of the front gearshift group 10 are selectively engageable by a looped transmission chain 13, to provide different gear ratios, through the electronically servo-assisted gearshift system 8.

The different gear ratios are obtained by moving a rear derailleur 14 of the rear gearshift group 9 and/or a front derailleur 15 of the front gearshift group 10.

Figure 2:
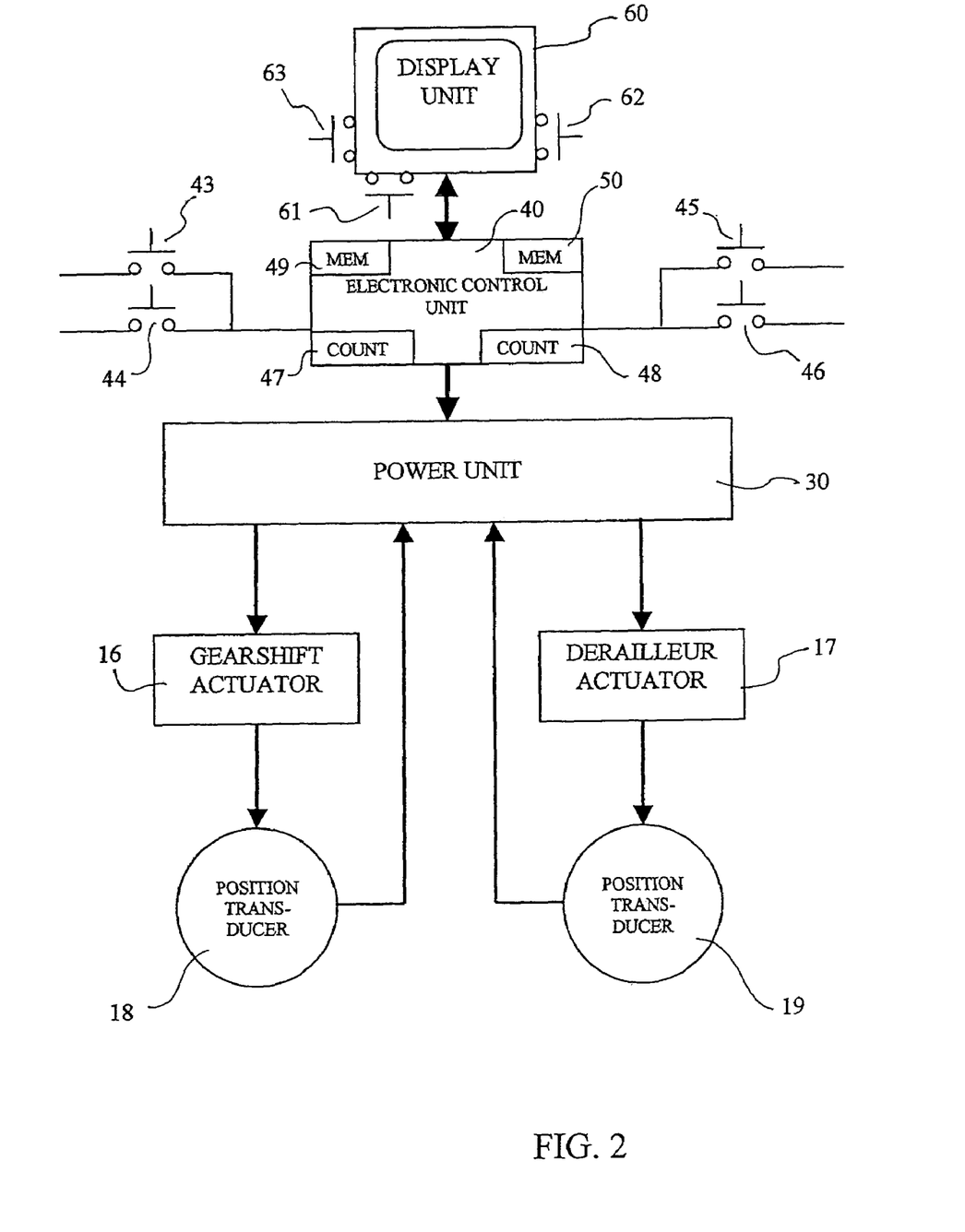
FIG. 2 illustrates a block diagram of the electronically servo-assisted gearshift according to the present invention, FIGS. 3 to 5 schematically illustrate different embodiments of storage means of the gearshift according to the preferred embodiment of the present invention.

Making reference to FIGS. 1 and 2, the rear derailleur 14 and the front derailleur 15 are controlled by a respective actuator 16, 17 which typically includes an articulated parallelogram mechanism and an electric motor with reducer to deform the articulated parallelogram.

Rear and front transducers 18, 19 respectively sense the location of the respective derailleur and respectively cooperate with the respective actuator 16, 17 to position the associated derailleur 14, 15.

The details of the construction of the derailleurs 14, 15, of the respective actuators 16, 17 and of the respective position sensors or transducers 18, 19 are not illustrated here since the present invention is not concerned with their specific construction. For further details thereof refer, for example, to the description in the aforementioned patent applications and patents which are incorporated herein by reference.

In particular, the transducers 18, 19 are preferably of the type described in EP 1 103 456 A2, suitable for providing electrical signals indicating the absolute positions of the derailleurs 14, 15.

An electronic power board 30, equipped with a battery, provides the electrical power to motors of the actuators 16, 17, to the transducers 18, 19, to a microprocessor electronic control unit 40 and preferably to a display unit 60. The battery is preferably of the rechargeable type and the rear derailleur 14 can include, a dynamo-electric unit of a type known in the art for recharging the battery.

The electronic control unit 40 is preferably a logic unit of a type known to those skilled in the art. The control unit 40 is preferably a single unit housed in the display unit 60. Alternatively, the control unit 40 may be housed in the electronic power board 30 or in a command unit. Further, the control unit 40 may include multiple units housed in one or more of the display unit 60, power board 30, or a command unit.

The electronic power board 30 is preferably housed in one of the tubes of the handlebar 70, in one of the tubes of the frame 2, for example at a support for a drinking bottle (not illustrated), or in the display unit 60, which is preferably housed centrally on the handlebar 70.

The information transfer between the various components is carried out through electrical cables, preferably housed inside the tubes of the frame 2, or alternatively using wireless devices known in the art, for example utilizing the Bluetooth protocol.

The rear and front derailleurs 14, 15 are controlled by the actuators 16, 17 which are controlled by the electronic control unit 40. Preferably, the control unit 40 receives upwards or downwards gear-shifting request signals from manual command devices. Alternatively, the control unit may generate request signals semi-automatically or automatically for the rear gear shift group 9. The manual command devices preferably include levers 43, 44 associated with the brake lever 41, for respectively producing upwards and downwards gear-shifting signals. The manual command devices also preferably include levers 45, 46 associated with the brake lever on the handlebar 70, for producing upwards and downwards gear-shifting signals for the front gearshift group 10 (the levers 45, 46 are not illustrated in FIG. 1 for the sake of clarity).

As an alternative to the levers 43, 44 (45, 46) two manually operated buttons, or two buttons which can be operated by a swing lever can be provided.

The electronic control unit 40 is also coupled with two transducers 18, 19 which produce signals indicative of positions of the front and rear derailleurs 15, 14 and to stop the motors of the actuators 16, 17 when the desired gear ratio has been reached. For example, when the derailleur 14 or 15 has reached one of sprockets 11 or 12 from an adjacent sprocket, a signal is transmitted by the transducer to the electronic control unit which notifies the unit 40 to turn off power to the actuator.

In an alternative embodiment, the motors of the actuators 16, 17 are stepper motors driven by a selected number of steps by the control unit 40 for each upwards or downwards gear-shift. In this embodiment the transducers 18, 19 are used to provide a feedback signal to the electronic control unit 40 to reactuate the motors of the actuators 16, 17 in the case in which the physical position corresponding to the adjacent sprocket 11 or 12 has not been reached. This may occur, for example, if the resisting torque offered by the derailleur 14, 15, which is to some degree dependent upon how the rider is pedalling, is too high, that is greater than the maximum torque which can be delivered by the stepper motor.

More specifically, according to the present invention, the electronic control unit 40 comprises a rear counter 47 and a front counter 48. The counters 47, 48 can, for example, each receive data from a register or a variable stored in a memory cell.

The electronic control unit 40, in the normal ride operating mode of the gearshift system 8, drives the actuators 16, 17 and tracks their position increasing or decreasing the counters 47, 48, for example by one unit for every step of the stepper motor and/or based upon the reading of the transducers 18, 19.

The electronic control unit 40 also comprises rear storage means 49 and front storage means 50, based upon which the electronic control unit 40 determines (in the ways described later on with reference to FIGS. 3–5) the logic values which the counters 47, 48 have when the derailleurs 14, 15 are positioned as desired with respect to sprockets 11, 12. In other words, if the chain 13 is at a first sprocket 11 (12) and the counter 47 (48) has a first logic value, when the rider actuates the manual upwards gear-shifting request command 43 (45) (or when such a request is generated by the electronic control unit 40 itself), the electronic control unit 40 provides for driving the actuator 16 (17) to displace the chain along axis A (B) in the selected direction until the counter 47 (48) reaches the logic value (read directly from the storage means 49 (50) or derived from the information read from the storage means 49 (50)) associated with the adjacent sprocket 11 (12), with immediately larger diameter. The chain 13 is then at the adjacent sprocket 11 (12), with immediately larger diameter. When the rider actuates the manual downwards gear-shifting request command 44 (46) (or when such a request is generated by the electronic control unit 40 itself), the electronic control unit 40 provides for driving the actuator 16 (17) to displace the chain along axis A (B) in the selected direction until the counter 47 (48) reaches the logic value (read directly from the storage means 49 (50) or derived from the information read from the storage means 49 (50)) associated with the adjacent sprocket 11 (12), with immediately smaller diameter. The chain 13 is then at the adjacent sprocket 11 (12), with immediately smaller diameter.

In the case in which the actuators 16, 17 comprise stepper motors, a movement of one step or an integer multiple of steps of the stepper motor, in a first or second direction of rotation, corresponds to each unitary increase or decrease of the counter 47, 48.

Figure 3:
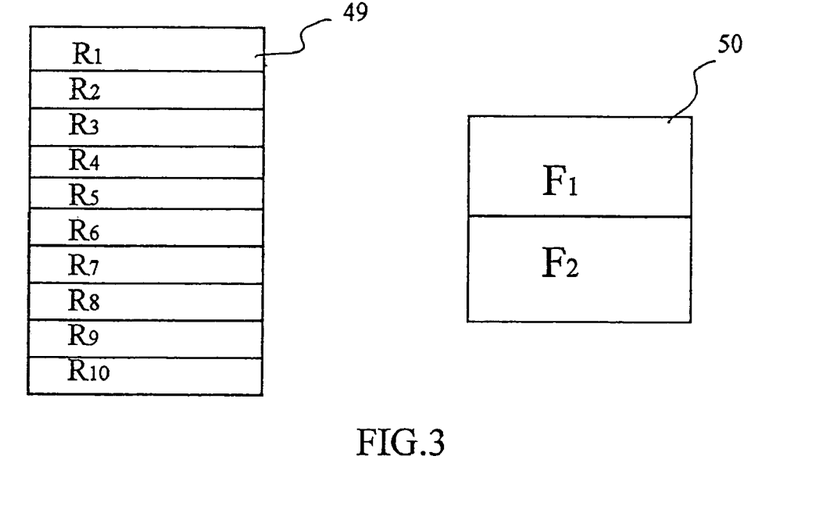

Making reference to FIG. 3, a first embodiment of the storage means is shown. The rear and front storage means 49 and 50 directly store a logic value associated with each sprocket 11, 12 of the respective gearshift group 9, 10. Thus, in the exemplifying case of rear gearshift group 9 comprising ten sprockets or pinions 11, the rear storage means 49 are suitable for storing a logic value R1 associated with the sprocket with the smallest diameter, a logic value R2 associated with the second sprocket, logic value R3 associated with the third sprocket, etc., up to a logic value R10 associated with the sprocket with the largest diameter; in the exemplifying case of front gearshift group 10 comprising two sprockets or crowns 12, the front storage means 50 are suitable for storing a logic value F1 associated with the sprocket with the smallest diameter and a logic value F2 associated with the sprocket with the largest diameter.

In this first embodiment, the electronic control unit 40 determines the logic values which the counters 47, 48 must assume so that the derailleurs 14, 15 are positioned as desired with respect to sprockets 11, 12 by reading the associated logic value directly from the memory 49, 50.

Figure 4:
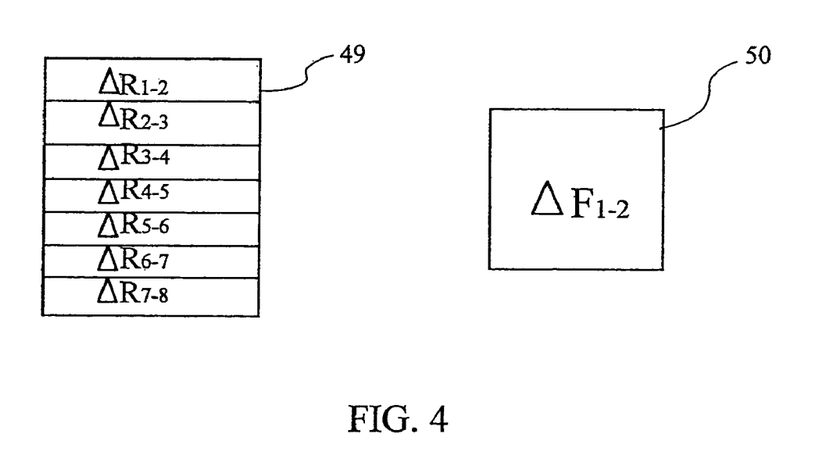

Making reference to FIG. 4, a second embodiment of the storage means 49,50 is shown. The rear storage means 49 stores a differential amount associated with each pair of adjacent sprockets 11. Thus, in the exemplifying case of rear gearshift group 9 comprising ten sprockets or pinions 11, the rear storage means 49 are suitable for storing a differential amount ΔR1–2 associated with the pair consisting of the sprocket 11 with the smallest diameter and the second sprocket 11 immediately adjacent to it (with a slightly larger diameter), a differential amount ΔR2–3 associated with the pair consisting of the second and third sprockets, etc., up to a differential amount ΔR9–10 associated with the pair of sprockets 11 having the largest diameters; in the exemplifying case of front gearshift group 10 comprising two sprockets or crowns 12, the front storage means 50 are suitable for storing a single differential amount ΔF1–2.

In this embodiment, the electronic control unit 40 determines the logic values which the counters 47, 48 must assume so that the derailleurs 14, 15 are positioned as desired with respect to sprockets 11, 12 by adding (or subtracting) the differential amount corresponding to the pair consisting of the current sprocket 11, 12 and the sprocket 11, 12 with immediately larger (or smaller) diameter stored in the memory 49, 50 to (or from) the current value of the counter.

When the gearshift groups 9, 10 including sprockets 11, 12 are equally spaced by a certain pitch, the rear storage means 49 and front storage means 50 (FIG. 5) are suitable for storing a single differential amount ΔR and ΔF. If the pitch between adjacent sprockets 11 of the rear gearshift group 9 is equal to the pitch between adjacent sprockets 12 of the front gearshift group 10, there may be only a single storage means, for example just the front memory 49.

According to the invention, the electronically servo-assisted gearshift system 8, and in particular its electronic control unit 40, is capable of operating, in a normal ride operating mode, or other operating modes, including a programming mode of the electronic control unit, a diagnostics mode, a "choice-of-operation mode" in which it is possible to choose between manual, automatic or semi-automatic control of the gearshift system 8, for example as described in document U.S. Pat. No. 5,865,454, and a setting mode.

A program can be used for an electronically servo-assisting a bicycle gearshift, including program code means suitable for carrying out the steps of the method above described when the program is run on a computer. The program is preferably embodied in at least one microcontroller. Alternatively, the program can be stored in a computer memory or embodied in a read-only memory.

The various operating modes are selected through manual mode selection command means, forming a user interface with the electronic control unit 40, preferably in cooperation with the display unit 60. The manual mode selection command means preferably includes two buttons 61, 62, located on the display unit 60. The user interface can of course include other buttons or levers, such as the button 63, at the display unit 60 and/or at the grips of the handlebar 70, used in the other operating modes. For example, when the rider presses the button 61 shown under the display unit 60, the electronic control unit 40 can show on the display unit 60 the various operating modes in cyclical sequence and the mode selection means can comprise the same button 61 for accepting the operating mode currently displayed on the display unit 60 and a button, for example the button 62, shown to the right of the display unit 60, to not accept it and cause the display of the next operating mode.

Alternatively, the electronic control unit 40 can show on the display unit 60 a menu containing all the various operating modes, and the mode selection means can include a button for scrolling a selection cursor cyclically in the menu, or two buttons to scroll the selection cursor in the menu in the two directions, as well as a button for accepting the operating mode upon which the selection cursor is currently displayed.

The buttons for selecting an operating mode, or the buttons for scrolling the cursor, may be the same upwards and downwards gear-shifting levers 43, 44 or 45, 46, the electronic control unit 40 interpreting the signal generated by the pressing of the levers according to the context, for example through logic gates or Boolean functions.

Figure 6:
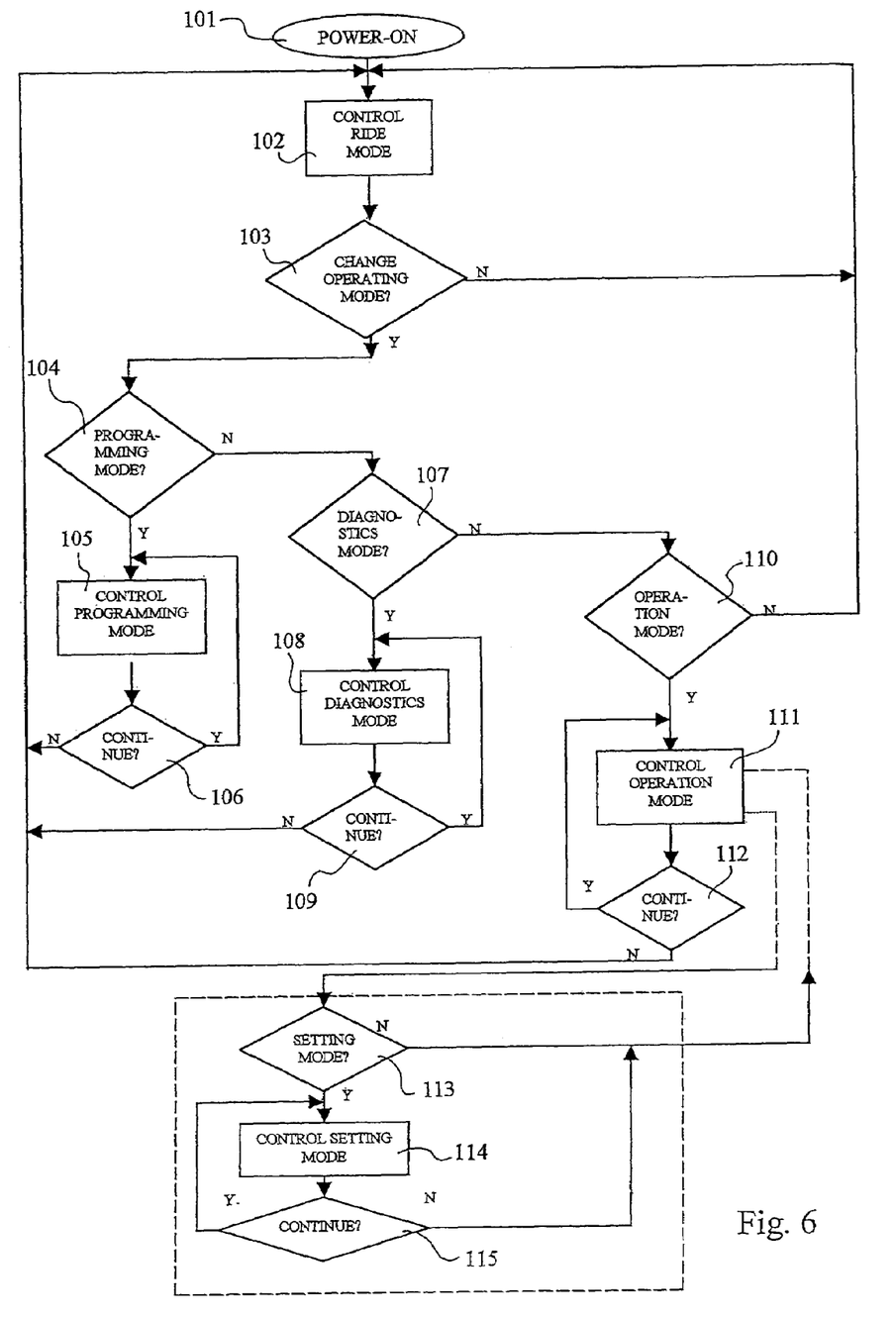
FIG. 6 illustrates a flow chart exemplifying a mode selection of the gearshift according to the invention, and FIGS. 7 and 8 jointly illustrate a flow chart of the preferred embodiment of a setting operating mode of the gearshift according to the present invention.

A flow chart exemplifying the mode selection of the gearshift system 8 according to the invention is presented in FIG. 6.

When power is switched on 101, the electronic control unit 40 operates in control ride mode 102 which allows manual operation. The system remains in this mode, in which it waits for and controls the signals coming from the gearshifting levers 43–46 in the way above described, negatively answering a query block 103 querying whether to change the operating mode. The query block 103 monitors a mode selection request signal generated by pressing the button 61.

If the mode selection request signal is activated, the electronic control unit 40 queries in a block 104 whether one wishes to enter into a programming mode and, in the affirmative case, controls such a mode in a block 105 remaining there until it receives a negative answer to a block 106 requesting whether one wishes to continue, returning to the block 102 for controlling the normal ride operating mode. In the case of a negative answer to the block 104, the electronic control unit 40 queries in a block 107 whether one wishes to enter into a diagnostics mode and, in the affirmative case, controls such a mode in a block 108 remaining there until it receives a negative answer to a block 109 requesting whether one wishes to continue, returning to the block 102 for controlling the normal ride operating mode. In the case of a negative answer to the block 107, the electronic control unit 40 queries in a block 110 whether one wishes to enter into the aforementioned operation selection mode and, in the affirmative case, controls such a mode in a block 111 remaining there until it receives a negative answer to a block 112 requesting whether one wishes to continue, returning to the block 102 for controlling the normal ride operating mode, in particular in manual, semi-automatic or automatic operation as chosen by the rider.

A request 113 whether one wishes to enter into a setting mode is nested within block 111, so that two confirmations are requested from the user to avoid such a setting mode being selected by mistake. In the case of a negative answer to the block 113, there is a return to block 111. In the case of an affirmative answer to the block 113, the electronic control unit 40 controls a setting operating mode 114, better described hereafter with reference to FIGS. 7 and 8, remaining there until it receives a negative answer to a block 115 request whether one wishes to continue or cause a return to block 111.

Figure 7:
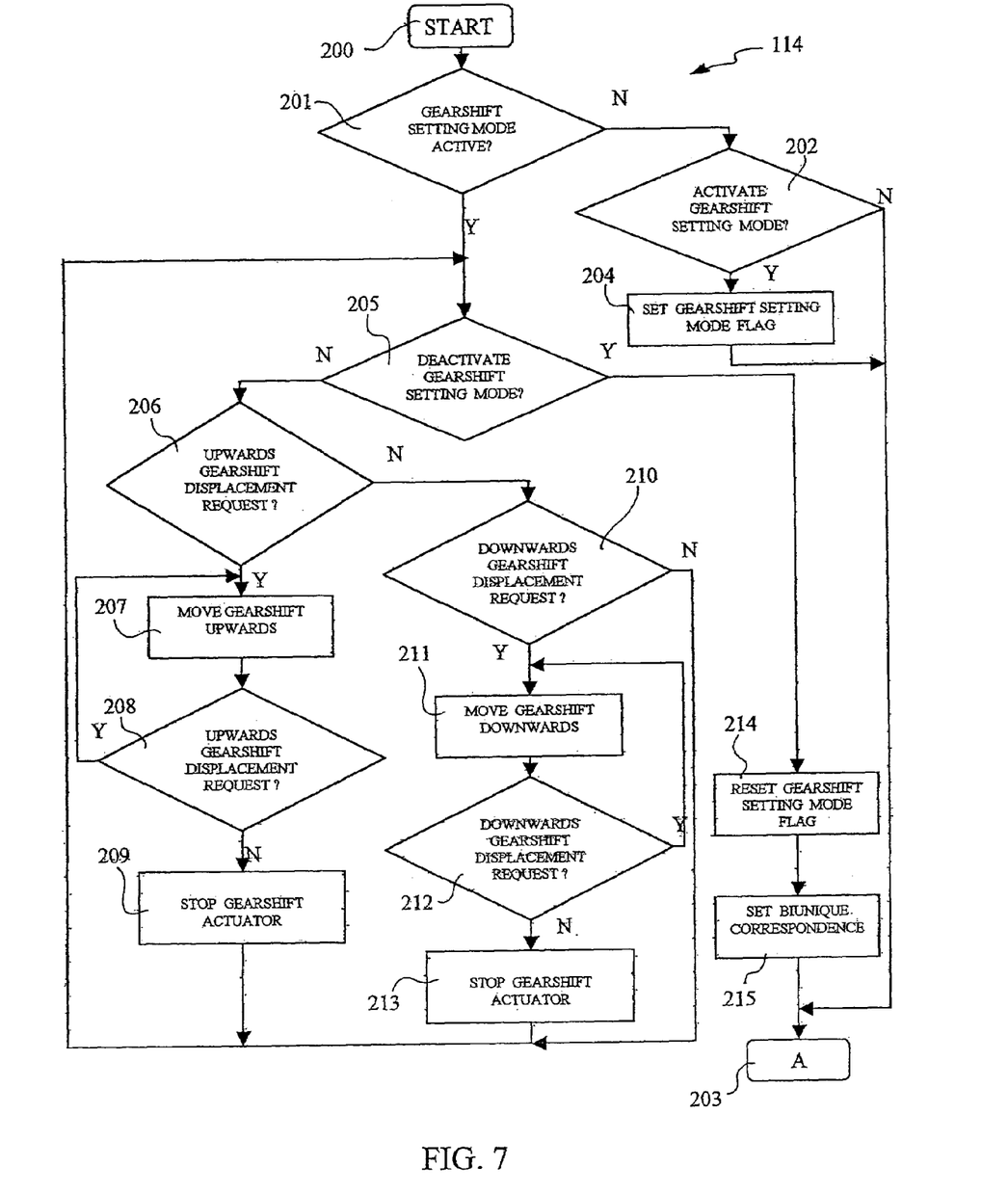
Figure 8:
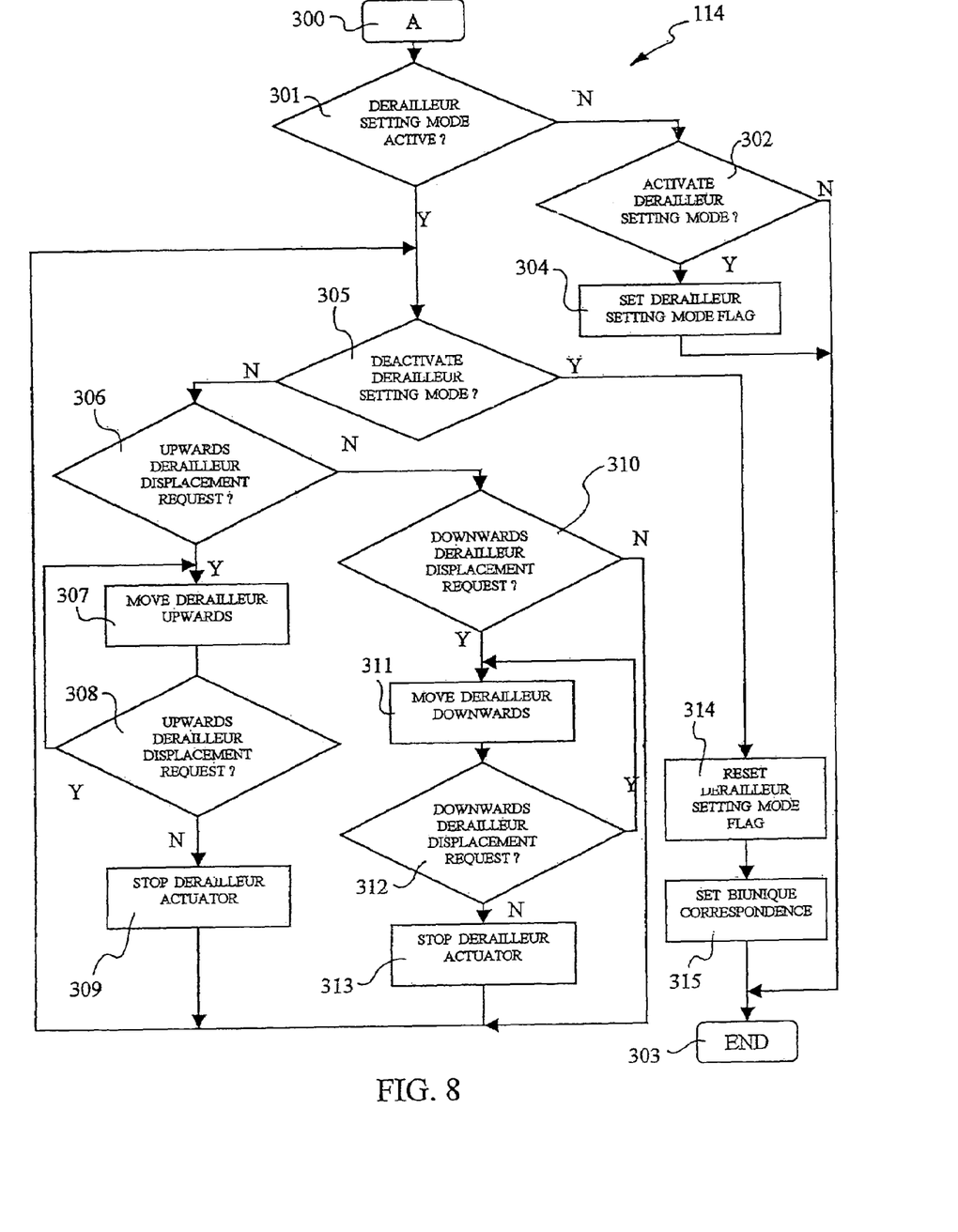

FIGS. 7 and 8 jointly illustrate a flow chart of the setting operating mode 114. In these figures the rear derailleur 14 is indicated as "gearshift", and the front derailleur 15 is indicated as "derailleur".

Starting from an initial block 200, in a block 201, the electronic control unit 40 checks if it is already in the setting mode of the rear gearshift group 9, referring to a gearshift setting mode flag. In the negative case, in a block 202 it is queried whether one wishes to activate the setting mode of the rear gearshift group 9 and, in the negative case, the setting mode, as far as the rear gearshift group 9 is concerned, terminates at a block 203. The block 203 corresponds to the start block 300 of the setting mode of the front gearshift group 10 illustrated in FIG. 8. The setting mode of the front gearshift group is completely analogous to the setting mode of the rear gearshift group and need not be further described herein.

In the case of an affirmative answer to block 202, the gearshift setting mode flag is set and the flow proceeds according to blocks 203/300, 301 and 302 (which provide a negative answer since the setting of the rear gearshift group 9 is being carried out), then returning to the initial block 200 (through block 115 of FIG. 6).

In block 201 since the setting mode flag is set, the gearshift setting mode is active, and the electronic control unit 40 queries in a block 205 whether one wishes to deactivate the gearshift setting mode.

In the negative case, the electronic control unit 40 determines in a block 206 whether the upwards gear-shifting request lever 43 has been pressed.

In the affirmative case, the electronic control unit 40 in a block 207 drives the rear actuator 16 so that it moves the chain in the direction towards the larger diameter sprocket(s) and thus continues to drive the rear actuator 16 in this way so long as the upwards gear-shifting request lever 43 remains pressed, as determined by a block 208. The rear actuator 16 is driven so as to displace the rear derailleur 14 by small distances, in any case smaller than the distance between two adjacent sprockets 11. Preferably, to allow more precise adjustment, the rear actuator 16 is driven at a low speed. In particular, in the case in which the rear actuator 16 comprises a stepper motor, this is driven to move by one step at a time or, if one wishes to obtain a faster adjustment, by a certain number of steps at a time.

When the upwards gear-shifting request lever 43 is no longer pressed, the actuator is stopped in a block 209 and there is a return to block 205, in which the electronic control unit 40 queries whether one wishes to deactivate the gearshift setting mode.

If the electronic control unit 40 determines in block 206 that the upwards gear-shifting request lever 43 has not been pressed, it checks in a block 210 whether the downwards gear-shifting request lever 44 has been pressed.

In the affirmative case, the electronic control unit 40, in a block 211, drives the rear actuator 16 (to displace the rear derailleur 14 in increments smaller than the distance between two adjacent sprockets 11, preferably, at a low speed (by one or more steps at a time when a stepper motor is employed). Therefore, the chain is displaced in a direction towards the smaller diameter sprocket(s). The rear actuator 16 is driven in this way so long as the downwards gear-shifting request lever 44 remains pressed, as checked in a block 212.

When the downwards gear-shifting request lever 44 is no longer pressed, the actuator is stopped in a block 213 and there is a return to block 205, in which the electronic control unit 40 queries whether one wishes to deactivate the gearshift setting mode.

If in block 205 the electronic control unit 40 receives a positive answer, in a block 214 it cancels the gearshift setting mode flag and, in a block 215, sets a biunique correspondence between the current physical position of the rear actuator 16, as determined by the transducer 18, and the logic value associated with the gear ratio relative to the sprocket 11 upon which the setting mode has been carried out.

In the preferred embodiment, in which the electronic control unit 40 includes the rear counter 47, the setting of the biunique correspondence is accomplished by setting the value of the rear counter 47 to the logic value associated with the sprocket upon which the setting is carried out, read or determined from the storage means 49.

The sprocket 11 upon which the setting mode is carried out is normally the one with the smallest diameter, but it can be programmed to choose the sprocket upon which to carry out the setting mode. In such a case, the electronic control unit 40 queries the user to specify the sprocket 11 upon which the setting mode is carried out or has been carried out, for example before block 204 or before block 215.

Therefore, with respect to the first embodiment of the storage means illustrated in FIG. 3, the value of the counter 47 is set to value R1 or to one of values R1, R2, . . . or R10, according to which of the sprockets 11 is chosen for the setting.

In the alternative embodiment of the storage means illustrated in FIG. 4, the counter 47 is zeroed when the sprocket 11 chosen for setting is the one with the smallest diameter. If the sprocket chosen for setting is the i-th wheel of the gearshift group, the value of the counter 47 is set to the value determined by the differential amount $\Delta R(i-1)-i$ associated with the pair consisting of one of the sprockets 11 chosen for setting and the other one of sprockets 11 with immediately smaller diameter, added to all the differential amounts associated with any pair of smaller diameter sprockets. In other words, in the case in which the setting is carried out on the second sprocket 11, the value of the counter 47 shall be set to $\Delta R1-2$, in the case in which the setting is carried out on the third sprocket 11, the value of the counter 47 shall be set to $\Delta R1-2+\Delta R2-3$ etc.

Figure 5:
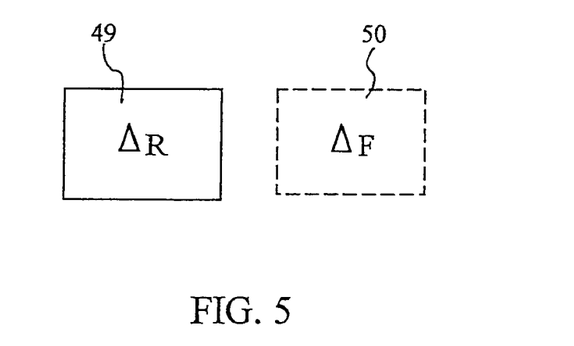

In the alternative embodiment of the storage means illustrated in FIG. 5, the counter 47 shall be zeroed when one of the sprockets 11 chosen for setting is the one with the smallest diameter. If the sprocket chosen for setting is the i-th wheel of the gearshift group, the value of the counter 47 shall be set to the value determined by the differential amount $\Delta R$ multiplied by $i-1$, in other words by the number indicating the position of the sprocket chosen for setting in the rear gearshift group 9, less one. In other words, in the case in which setting is carried out on the second of sprockets 11, the value of the counter 47 shall be set to $\Delta R$, in the case in which setting is carried out on the third sprocket 11, the value of the counter 47 shall be set to $\Delta R*2$, etc.

In another alternative embodiment, the setting of the biunique correspondence can be accomplished by modifying the logic value R1, R2, . . . R10, F1, F2 (or, with the appropriate calculations, the values of the differential amounts □Rx, □Fy) of the storage means 49 associated with the sprocket on which the setting is carried out, based upon the value of the rear counter 47. Should it be permitted to modify the logic values associated with the sprockets in this way, it shall be appropriate to provide for the possibility of returning to the default logic values (corresponding to nominal or average values), suitably stored in read only storage means.

The setting mode 114 is preferably carried out in a workshop with the bicycle mounted on a stand.

A first procedure is that of holding the bicycle still, manually moving exclusively the actuator 16 up and down and stopping, in other words coming out from the setting operating mode, when one believes to have obtained the optimal alignment "by sight".

The alignment by sight can be improved with different provisions both mechanical and electronic. One can, for example, mount a plate on one of the small idle sprockets of the rear derailleur 14 (and/or on the front derailleur 15), so that there is alignment when it touches the sprocket 11 (12) with the smallest diameter or in any case the one predetermined for setting. Or else, on the small sprocket a laser diode can be mounted and on the sprocket 11 (12) a laser light receiver can be mounted, or vice-versa. To further improve alignment, one could exploit "light triangulation", etc.

A second procedure is that of actuating the chain through the pedal crank unit 7 and verifying the alignment "by sound". An expert user, indeed, can understand that with best alignment there is also minimum noisiness.

Clearly, one can combine the two procedures and make the alignment using both sight and sound.

It is possible to add a step in which (during the normal ride operating mode) the gearshift system 8 is adjusted through a complete range of upwards travel (and/or a complete range of downwards travel), while simultaneously performing inspection by sight and/or by sound. At the end of the complete range of travel(s) (returning to setting mode) the setting is "refined". Thus, operation can be carried out manually by the operator, or else automatically by the electronic control unit 40. Of course, if just one complete travel is carried out, the setting shall then be "refined" on a different sprocket from the one upon which the initial setting was carried out.

It is also possible to carry out an automatic or semi-automatic setting, providing for sensors (not shown) of the relative position between the derailleur 14, 15 and the sprocket 11, 12 chosen for setting. Such relative position sensors can for example include a collimated light source and a photodetector respectively associated with the derailleur 14, 15 and with the sprocket 11, 12. When the photodetector detects the light emitted from the collimated light source, it transmits information to the electronic control unit 40 on the desired alignment, corresponding to the positive outcome of block 205 (305) requesting whether one wishes to deactivate the gearshift setting mode. In the case in which the photodetector has a certain extension in the axial direction of the sprocket 11, 12, like for example in the case of a linear CCD sensor, it can also identify, according to the point in which it receives the light coming from the collimated light source, what is the displacement direction necessary for reaching alignment, sending corresponding signals to the electronic control unit 40. Such signals correspond to the positive outcome of blocks 206, 208, 210, 212 (306, 308, 310, 312) which determine whether the upwards or downwards gearshifting request lever has been pressed.

The displacement of the derailleur 14, 15 in the setting operating mode is preferably carried out at low speed, and in particular through a movement of a certain number of steps in the case of a stepper motor, or more preferably by only one step or by two steps at a time.

In such a way, the setting operating mode 114 can be carried out periodically, in a workshop, dedicating all the necessary time and obtaining a very precise result, i.e. a fine adjustment.

The microprocessor(s) of the electronic control unit 40 can, for example, be made in C-MOS technology, which has the advantage of having low power consumption.

As an alternative to implementation through dedicated hardware, the functionalities of the electronic control unit 40 described above can be accomplished by a software program loadable in a small computer.

In another alternative embodiment, the setting mode 114 can be implemented by a second electronic board separate from a first electronic control board which controls the gearshift system 8 in the normal ride operating mode 102 and optionally the other operating modes. The setting mode 114 may also be implemented by a software program separate from a control program which controls the gearshift system 8 in the normal ride operating mode and, optionally, the other operating modes. By using a software procedure, the setting mode 114 can be provided as an update to existing servo-assisted gearshifts.

What is claimed is:

1. A method for controlling an electronically servo-assisted bicycle gearshift, comprising the steps of:
    a) driving an actuator of a bicycle gearshift to displace a chain of the gearshift in a chosen axial direction with respect to a gearshift group having a plurality of sprockets including at least two adjacent sprockets,
    b) receiving information in a control unit on a desired alignment between the chain and a predetermined sprocket of the gearshift group, and
    c) setting a biunique correspondence, in a control unit, between the physical position of the actuator and a logic value associated with a gear ratio relative to the predetermined sprocket.

2. The method of claim 1, wherein the predetermined sprocket is a sprocket with the smallest diameter of the gearshift group.

3. The method of claim 1 wherein step c of setting a biunique correspondence includes the step of setting the value of a counter to a logic value pre-associated with the predetermined sprocket.

4. The method of claim 3 wherein said step c of setting a biunique correspondence further includes the step of zeroing the counter.

5. The method of claim 1 wherein said step c of setting a biunique correspondence includes the step of storing in storage means a current value of a counter as a logic value pre-associated with the predetermined sprocket.

6. The method of claim 5 wherein steps a-c are repeated for each of the plurality of sprockets and a corresponding logic value.

7. The method of claim 1, further comprising the steps of:
    d) providing a user interface,
    e) receiving through the user interface a displacement request signal of the actuator in the chosen direction;
    wherein in step a) of driving the actuator, the displacement of the chain is carried out in the chosen direction in accordance with the displacement request signal received in step e.

8. The method of claim 7 wherein said step b) of receiving information on the desired alignment is carried out through the user interface.

9. The method of claim 1, further comprising the step of:
f) providing means for detecting the relative position between the chain and the predetermined sprocket and providing the information on the desired alignment.

10. The method of claim 9, wherein the means for detecting the relative position between the chain and the predetermined sprocket is further suitable for providing a displacement request signal of the actuator in the chosen direction,
wherein in step a) of driving the actuator, the displacement of the chain is carried out in accordance with the displacement request signal.

11. The method of claim 10, wherein said step a) is carried out with the bicycle still.

12. The method of claim 10, wherein said step a) is carried out keeping the chain of the gearshift in motion.

13. The method of claim 10, further comprising the steps of:
g) receiving an operating mode signal selected from a group consisting of at least a normal ride operating mode and a setting operating mode;
h) receiving a displacement request signal of the actuator to displace the chain of the gearshift in the chosen axial direction with respect to the gearshift group;
i) wherein when the operating mode signal corresponds to the setting operating mode, at least steps a-c are carried out;
j) wherein when the operating mode signal corresponds to the normal ride operating mode, the step of driving the actuator of the gearshift to displace the chain of the gearshift in the chosen axial direction with respect to the gearshift group, between the physical position corresponding to a first sprocket of the gearshift group and the physical position corresponding to a second sprocket of the gearshift group, the physical positions being determined by the logic values associated with the sprockets, is carried out.

14. The method of claim 13, wherein the step j) comprises driving the actuator to displace the chain in the chosen axial direction by a distance determined by modifying the value of a counter by a differential amount pre-associated with the pair formed by the first sprocket and the second sprocket.

15. The method of claim 14, wherein the differential amounts pre-associated with each pair of adjacent sprockets of the gearshift group are equal to each other.

16. The method of claim 1, further comprising the steps, carried out after step b), of receiving information on the desired alignment of:
k) driving the actuator of the gearshift to displace the chain of the gearshift in the chosen axial direction with respect to the gearshift group from the current position sequentially to each adjacent sprocket of the gearshift group;
l) driving the actuator to displace the chain in the chosen axial direction with respect to the gearshift group; and
m) receiving second information on the desired alignment between the chain and a predetermined sprocket of the gearshift group.

17. The method of claim 16, further comprising the step, carried out between step k) and step m), of:
k1) driving the actuator of the gearshift to displace the chain of the gearshift in the chosen axial direction with respect to the gearshift group sequentially to each adjacent sprocket of the gearshift group up to the predetermined sprocket.

18. The method of claim 17, wherein in step l) where provided for, the actuator is driven to displace the chain at a comparatively low speed, and in steps j), k) and k1) the actuator is driven to displace the chain at a comparatively high speed.

19. The method of claim 17, wherein in step l) a stepper motor of the actuator is driven to displace the chain through a movement of one step.

20. The method of claim 17, wherein in step a) where provided for, the actuator is driven to displace the chain at a comparatively low speed, and in steps j), k) and k1) the actuator is driven to displace the chain at a comparatively high speed.

21. The method of claim 1, wherein in step a) a stepper motor of the actuator is driven to displace the chain through a movement of one step.

22. A bicycle gearshift comprising:
a rear actuator and a front actuator, each having a respective motor, to displace through a guide element a chain in an axial direction with respect to a respective gearshift group comprising at least two sprockets respectively associated with the hub of the rear wheel and with the axle of the pedal cranks of a bicycle, in a selected direction;
manual input means comprising means for entering a displacement request signal of a selected actuator in the selected direction; and
an electronic control unit connected to the input means, to the rear actuator and to the front actuator, operative, in a normal ride operating mode, to drive the selected actuator, respectively, based upon the displacement request signal to displace the chain from a first sprocket to a second adjacent sprocket of the respective gearshift group;
wherein the manual input means comprises means for selecting the operating mode at least between said normal ride operating mode and a setting operating mode;
wherein the electronic control unit, in the normal ride operating mode, drives the selected actuator between a logic value associated with the first sprocket and a logic value associated with the second sprocket; and
wherein the electronic control unit is operative, in the setting operating mode, to drive the selected actuator based upon the displacement request signal to displace the chain in the selected direction, the electronic control unit also having means for inputting information on the desired alignment between the chain and a predetermined sprocket of the gearshift group, and means, responsive to the means for inputting information on the desired alignment, for setting a biunique correspondence between the physical position of the selected actuator, respectively, and the logic value associated with the predetermined sprocket.

23. The gearshift of claim 22, wherein
the means for setting a biunique correspondence comprise means for setting the value of a selected counter to the logic value pro-associated with to predetermined sprocket.

24. The gearshift of claim 23, wherein the predetermined sprocket is the sprocket with the smallest diameter and the means for setting a biunique correspondence comprise means for zeroing the selected counter .

25. The gearshift of claim 23, wherein the motors of the rear and front actuators are stepper motors and a displacement of the selected actuator by one step or by an integer multiple of steps corresponds to a unitary increase or decrease of the selected counter.

26. The gearshift of claim 22, further comprising means for detecting the physical position of the selected actuator and providing the physical position to the electronic control unit, the means comprising a rear transducer and a front transducer.

27. The gearshift of claim 26, wherein in normal ride operating mode, the electronic control unit drives the selected actuator, respectively, to displace the chain between the first sprocket and the second sprocket, wherein a feedback signal is generated when the physical position corresponding to the first sprocket or the second sprocket has not been reached, and wherein the feedback signal is transmitted to the electronic control unit to re-actuate the motors of the actuators.

28. The gearshift of claim 26, wherein the means for detecting the physical position further comprises means for detecting the relative position between the selected actuator and the predetermined sprocket and for generating the information on the desired alignment.

29. The gearshift of claim 28, wherein the means for detecting the relative position is also suitable for generating the displacement request signal of the actuator in the selected direction.

30. The gearshift according to claim 22, further comprising means for storing a differential amount pre-associated with each pair of adjacent sprockets, wherein in the normal ride operating mode the logic value associated with the second sprocket is determined by adding the differential amount pre-associated with the pair formed by the first and second sprocket to the logic value associated with the first sprocket.

31. Gearshift of claim 30, wherein the differential amounts pre-associated with each pair of adjacent sprockets of the gearshift group are equal to each other.

32. The gearshift of claim 22, wherein:
the means for setting a biunique correspondence comprise means for storing in storage means the current value of a rear or front counter as logic value pre-associated with the predetermined sprocket.

33. A gearshift according to claim 22, further comprising means for outputting information defining, with the manual input means, a user interface with the electronic control unit.

34. A gearshift according to claim 22, further comprising a power board arranged between the electronic control unit and the rear and front actuators.

35. A gearshift according to claim 22, wherein the electronic control unit comprises at least one microcontroller made in C-MOS technology.

36. The gearshift according to claim 22, wherein the electronic control unit is distributed and comprises many microcontrollers at a display unit and at a unit for controlling the manual input means and at a power board.

37. A method for providing a control setting mode of an electronic control unit for a servo-assisted bicycle gearshift system comprising:
activating a gearshift setting mode;
determining whether a gearshift displacement request is received;
moving the gearshift to a desired physical gearshift position;
setting a gearshift setting mode flag;
resetting the gearshift setting mode flag at the desired physical gearshift position; and
setting a biunique correspondence between the desired gearshift position and a logic value associated with a predetermined gear ratio.

38. The method of claim 37, wherein the step of moving the gearshift include the step of actuating an actuator.

39. The method of claim 37, wherein the step of setting the biunique correspondence includes setting the value of a counter to the logic value associated with the predetermined gear ratio which corresponds to a predetermined sprocket.

40. The method of claim 39, wherein the step of setting the value of the counter includes setting the value of the counter to an absolute logic value associated with the predetermined sprocket.

41. The method of claim 39, wherein the step of setting the value of the counter includes setting the value of the counter to a logic value corresponding to a summation of differential amounts associated with the predetermined sprocket, wherein each of the differential amounts is associated with a pair of adjacent sprockets.

42. The method of claim 37, wherein the step of setting the biunique correspondence includes the step of setting a biunique correspondence between the desired gearshift position and a logic value associated with a user-specified predetermined gear ratio.

43. The method of claim 37, further comprising determining the desired physical gearshift position using a position transducer.

44. The method of claim 37, further comprising retrieving the logic value from a memory of the electronic control unit.

45. A bicycle gearshift system comprising:
at least one actuator for displacing a transmission chain from a first to at least a second sprocket;
at least a first input device for entering a displacement request signal and for selecting between operating modes;
an electronic control unit, for driving the actuator in a first operating mode, in response to the displacement request signal, between a first logic value associated with the first sprocket and at least a second logic value associated with the second sprocket, and, in a second operating mode, for setting a biunique correspondence between a physical position of the actuator and a logic value associated with a predetermined sprocket.

46. The bicycle gearshift system of claim 45, further comprising a second input device for inputting information on a desired alignment of the chain on the predetermined sprocket.

47. The bicycle gearshift system of claim 45, wherein the electronic control unit includes a counter and wherein, in the second operating mode, the biunique correspondence is setable by setting a value of the counter to the logic value associated with the predetermined sprocket, and wherein in the first operating mode, the value of the counter is modifiable, in response to the displacement request signal, by an amount proportional to the difference between at least the first and second logic values, and the actuator is drivable a distance corresponding to the value of the counter.

48. The bicycle gearshift system of claim 47, wherein the electronic control unit comprises memory for storing the value of the counter.

49. The bicycle gearshift system of claim 47, wherein the electronic control unit comprises memory for storing at least one differential amount, associated with at least a pair of adjacent sprockets, for determining the logic value of a second one of the pair of sprockets in the first operating mode by adding the logic value of a first one of the pair of sprockets to the differential amount.

50. The bicycle gearshift system of claim 45, wherein the at least one actuator comprises a front and rear actuator for actuating a front and rear derailleur respectively of a bicycle.

51. The bicycle gearshift system of claim 45, further comprising at least one position transducer for detecting the physical position of the actuator and transmitting a position signal to the electronic control unit.

52. The bicycle gearshift system of claim 45, further comprising a power board for supplying power to at least the actuator and the electronic control unit.

53. The bicycle gearshift system of claim 45, further comprising a display unit which is integral with the control unit and the input device.

* * * * *

UNITED STATES PATENT AND TRADEMARK OFFICE
CERTIFICATE OF CORRECTION

| | | |
|---|---|---|
| PATENT NO. | : 7,223,189 B2 | Page 1 of 1 |
| APPLICATION NO. | : 10/664305 | |
| DATED | : May 29, 2007 | |
| INVENTOR(S) | : Gianfranco Guderzo et al. | |

It is certified that error appears in the above-identified patent and that said Letters Patent is hereby corrected as shown below:

Column 8, Line 65, delete "□Rx, □Fy" and insert --$\Delta Rx$, $\Delta Fy$--, therefor.

Claim 23, line 4, delete "pro-associated with to" and insert --pro-associated with the--, therefor.

Signed and Sealed this

Twenty-first Day of October, 2008

JON W. DUDAS
*Director of the United States Patent and Trademark Office*